3,087,865
PROCESS FOR MAKING PESTICIDAL
COMPOSITIONS
Billy Blandin Drake, Philadelphia, Pa., and Carl V. Smythe, Moorestown, N.J., assignors to Rohm & Haas Company, Philadelphia, Pa., a corporation of Delaware
No Drawing. Filed May 2, 1961, Ser. No. 107,013
19 Claims. (Cl. 195—96)

The invention deals with processes for preparing compositions toxic to pests. Specifically, the invention deals with processes for making compositions comprising elements obtained from a microorganism and which are toxic to pests.

The idea of using microorganisms to destroy noxious insects has been under consideration for quite a number of years. More recently, a number of articles on this subject have been published. In Agricultural and Food Chemistry, vol. 4, No. 8 (1956), Steinhaus brings out the potentialities for microbial control of insects. The microorganism which was most commonly used was *Bacillus thuringiensis* isolated by E. Berliner (Ztschr. f. das Ges. Getreidemesen, 3, 63–70 (1911)). According to Berliner, the microorganism is a spore-forming Gram positive motile rod. During sporulation, the cells of the microorganism contain a spore at one extremity and, at the other extremity, a rhombohedral crystal or asporal inclusion body. (C. L. Hannay and P. Fitz-James, Can. J. Microb., vol. 1, pp. 694–710, 1955.) Rab et al., in Journal Economic Entomology, 50, No. 3 (1957), "Preliminary Tests Using *Bacillus thuringiensis* Berliner Against Horn Worms," supplement the prior findings in this field. Articles in Nature, 173, pp. 545–546 (1954), in the Canadian Journal of Microbiology, 2, pp. 111–121 (1956), and other articles, published by Edward A. Steinhaus and others in Hilgardia, a Journal of Agricultural Science, published by the California Agricultural Experiment Station, point out that other spore-forming bacteria are pathogenic to insects.

Such bacilli which produce elements toxic to pests are readily available in recognized depositories, such as at the California Experiment Station, Berkeley, California, the American Type Culture Collection, Washington, D.C. (*Bacillus thuringiensis* ATCC 10792), the Higher Education and Science Bureau of the Ministry of Education, Tokyo, Japan (*Bacillus sotto*, Japanese Collection No. 117C).

Notwithstanding this long standing interest in the development of a practical and effective microbial pesticide, significant progress towards such a product has been stymied by vexing problems. Some of these relate to the microbial product itself; one of its serious shortcomings has been attributed to its unduly narrow spectrum of effectiveness to only one insect species in cases where it is desired to kill several types of noxious pests (Agricultural and Food Chemistry, 4, No. 8; 677 (1956)). Other serious problems have been encountered in the development of a practical method for growing a spore-forming bacillus pathogenic to insects and for making an effective microbial pesticide. Workers have been confronted with unduly long fermentations, inadequate formation or too slow a formation of spores and/or of inclusion crystals, premature germination of the spores and difficulties in separating the bacilli from the medium. Recently, an attempt to overcome some of these difficulties has been published, on October 12, 1960, as French Patent No. 1,233,208 to Megna of Bioferm Corporation. The solution attempted by Megna for growing the spore-forming *Bacillus thuringiensis* or *Bacillus sotto* is the use of a fermentation medium containing a limited supply of fermentable carbohydrates and assimilable nitrogen for growing the bacillus under submerged aerobic conditions. The supply of these two nutrients is such that it is exhausted within a time differential not exceeding six hours and, preferably, at about the same time after the start of sporulation. The whole tenor of the described process is to first, exhaust and, hence, to limit, the supply of the two nutrients within the time differential specified, thereby subjecting the cells to a form of limited "starvation" and then, subsequently, collecting the cells as by filtration and discarding the filtrate, the spent liquid medium. This is using essentially a known manner of limited starvation of the microorganism (Journal of Applied Bacteriology, vol. 20, No. 3, pp. 315–324 (1957)), thereby inducing formation of the inclusion bodies and spores and minimizing germination of the latter. Moreover, the Megna patent warns against using an unbalance in the supply of the fermentable carbohydrate and assimilable nitrogen because of the resulting difficulties: incomplete sporulation, undesirable cell division, liberation of spores, and inclusion crystals, spore germination, decreased viable cells, and increased difficulties in separating the spores from the medium. This separation is accomplished, as disclosed by the patent and by an article in Chemical Engineering, October 3, 1960, pp. 42–44, "Flask-Tank Setup Now Turns Out First 'Bug Kill Bug' Insecticide," by filtration after fermentation to obtain the dry spores and by discarding the spent broth. In addition to the limitation imposed on the relative supply of nutrients, the Megna process also uses a medium in which the total supply of nutrients is limited to 3 or 4 percent. Under these conditions, only a maximum of $5 \times 10^9$ bacterial cells per ml. are obtained.

Another recent attempt to solve the difficulties connected with the development of an effective microbial pesticide was published as French Patent No. 1,225,179 to Pasteur Institute. And French Patent No. 1,247,677 to Farbwerke Hoechst deals with a process for drying wet spores of *Bacillus thuringiensis*, after separation of the spent fermentation broth, with anhydrous sodium sulfate.

The present invention provides processes for making new compositions comprising elements toxic to pests. These toxic elements are produced by a microorganism such as a fungus or bacterium. In one embodiment of the invention the toxic elements are obtainable from a Bacillus. In a notable aspect, the toxic elements are obtained from an inclusion body-forming Bacillus. There is also provided a composition comprising inclusion bodies of an inclusion body-forming Bacillus, a composition comprising spores of an inclusion body-forming Bacillus, and, yet another valuable composition, is one comprising the water-soluble toxins of an inclusion-body-forming Bacillus. Another embodiment provides compositions comprising spores, inclusion bodies and water-soluble toxins of an inclusion body-forming Bacillus in varying proportions of each of these elements. A valuable property of such a composition is their broad spectrum of toxicity on various noxious pests, such composition being lethal not only on insects represented by salt-marsh caterpillars (*Estigmene acrea*) but also on insects typified by the southern army worm (*Prodemia eridania*) and the larvae of the common housefly (*Musca domestica*).

Furthermore there is provided herein a composition comprising inclusion bodies and spores of an inclusion body-forming Bacillus; a composition comprising spores and inclusion bodies of an inclusion body-forming Bacillus, and a composition comprising spores of an inclusion body-forming Bacillus and the water-soluble toxins of a toxin-producing microorganism; and a composition comprising inclusion bodies of an inclusion body-forming Bacillus and the water-soluble toxins of a toxin-producing microorganism, such as a Bacillus. These compositions are provided in various forms, such as liquids or solids. Very valuable compositions provide that the spores and/or the inclusion bodies be released from the cells of the microorganism in which they were previously contained. The compositions of the invention are notable for their lethal effect, sometimes quite specific, on various noxious pests.

The invention also provides a process which comprises growing a microorganism which produces a substance toxic to pests under aerobic, submerged conditions in a medium comprising assimilable carbohydrate and assimilable nitrogen. The invention also provides a process which comprises growing inclusion body-forming Bacillus under aerobic, submerged conditions in a medium comprising assimilable carbohydrate and assimilable nitrogen. In one aspect of the process, there is obtained a microbial population of over $5 \times 10^9$ microorganisms per milliliter, preferably over $9 \times 10^9$, and generally at least $10 \times 10^9$ bacilli per milliliter over 90%, usually over 95%, of the bacteria having developed a spore and an inclusion body. In another aspect, there is provided a process whereby the majority, and preferably over 95% of the bacillus cells, have released both the spores and the inclusion bodies. In accordance with a preferred aspect of the invention the growth medium comprises at least 8%, and preferably at least 10%, total nutrient solids. Another embodiment comprises separating the toxic elements of the spent growth medium. Yet, another embodiment comprises mixing two or more of the toxic elements to give compositions useful in combating pests.

Any microorganism which produces a substance toxic to pests may be grown in accordance with this process, with suitable adjustments, as may be desired, to suit the particular microorganism selected. The microorganisms that may be used include fungi and bacteria. The fungi belong to the Phycomycetes, Ascomycetes, Basidomycetes or Deutromycetes classes. Amongst the fungi, there may be used the following: *Metarrhizium anisopliae* (green muscardine fungus), *Beauveria bassiana* (white muscadine), *Beauveria flobulifera* (white fungus), *Empusa grylli* (a mucor), *Beauveria densa*, *Sorosporella uvella*, *Empusa erupta*, *Aspergillus flavus*, *Spicaria farinosa* and others. Amongst the bacteria (cocci or rod types) that may be grown in accordance with the invention, there may be listed the following:

*Bacillus alvei,*
*Bacillus larvae,*
*Bacillus finitimus,*
*Bacillus laterosporus,*
*Bacillus pulvifaciens,*
*Bacillus lentimorbus,*
*Bacillus popilliae,*
*Bacillus ephestiae,*
*Bacillus sphaericus,*
*Bacillus rotans,*
*Bacillus bombyces,*
*Bacillus entomocidus,*
*Bacillus thuringiensis,*
*Bacillus thuringiensis gelechia,*
*Bacillus thuringiensis Cazaubon,*
*Bacillus thuringiensis Berliner,*
*Bacillus thuringiensis galleriae,*
*Bacillus thuringiensis anduze,*
*Bacillus entomocidus subtoxious,*
*Bacillus sotto,*
*Bacillus pyrenei,*
*Bacillus dentrolimus talalor,*
*Bacillus ureaus,*
*Bacillus laterospours,*
*Bacterium entomotoxicon,*
*Aerobacter aerogenes, Escherichia coli, Serratia marcescens,*
*Streptococcus aris,*
*Streptococcus bombycis,*
*Micrococcus nigrofaciens,* and the like.

Within the context of the invention, the term "microorganism which produces a substance toxic to pests" includes the term pathogenic microorganism. Hence, location or time at which the microorganism produces the toxin lethal to the pest is immaterial; it may be during the growth of the microbe and/or later during contact of the microbial composition with the pest; and, there may be one or more toxins involved.

In accordance with the process for growing the toxic substance-producing microorganism, such as bacillus, there is employed an aqueous nutrient medium comprising a utilizable source of energy, assimilable carbon, and nitrogen.

Any substance that can be oxidized and/or fermented may be a suitable source of energy. A preferred source is a carbohydrate material. Examples of such carbohydrates include sugars, such as glucose, levulose, maltose, mannose, sucrose, lactose, arabinose, galactose, dextrin, starch, and xylose in purified or crude product forms, singly and/or mixture, the so-called soluble starches and dextrins and other partially or fully water-soluble carbohydrate substances. Other oxidizable materials include fats, glycerols, glycols, and nitrogen-containing compounds, such as proteins, which may serve both as energy and carbon sources. It is advantageous to use as the carbohydrate source a by-product from various processes, such products as whey, or molasses, corn steep liquor, sulfite waste liquid, and like products. As the source of nitrogen, there may be conventionally used a complex proteinaceous material, such as soybean meal, yeast extract, hydrolyzed casein, whey, and whey powder, buttermilk, cotton seed meal, oat meal, peptone, amino acids, condensed fish solubles, meat extract, and other like nitrogenous substances of vegetable or animal origin. When desired, inorganic sources of nitrogen may be used, alone or in conjunction with those described above. Typical are nitrates, ammonium salts, mineral salts, such as sodium chloride, potassium chloride, magnesium sulfate. Further trace elements may be provided, if desired, such as iron, copper, cobalt, sulfur, manganese, molybdenum, calcium, and aluminum. The temperature should be such as to promote growth during the growth stage of the microorganism, generally in the range of 15° to 40° C. or higher or lower.

To promote optimum growth, development of spores and/or toxins, it is advantageous to provide aeration to the culture medium. Aeration should preferably be adequate to sustain the metabolic oxygen requirements of the microorganism and preferably should also free the medium of undesirable metabolic by-products. To effectuate this, there may be provided sterile air, at the rate of 0.25 to 1.0 volume per volume of medium per minute. A satisfactory rate is also provided by a supply of air fed at a rate to provide that not more than 40% of the oxygen is utilized by the bacillus or that the effluent air has a content of not more than about 10% of carbon dioxide. Preferably, mechanical agitation is also provided to increase the aeration of the submerged culture. If desired, antifoam compositions may be provided to minimize foaming. Typical of these are lauric acid, oleyl alcohol, oleic acid, silicones, lard oil, liquid paraffin, and the like. If desired, wetting and dispersing agents may also be employed. Suitable in this purpose, there may be mentioned alkaryl sulfonates, alkylphenopolyethoxyethanols, lignin, sulfonates, and condensed naphthalene-formaldehyde sulfonates.

When it is desired to grow a bacillus, the following method may be used: The vegetative inoculum, which is used for inoculation of the fermentors, is generally obtained by providing a starter which is carried through two or more transfers in an appropriate liquid medium. A convenient procedure is to inoculate a 500 ml. Erlenmeyer flask with a culture of the desired bacillus, such as *Bacillus thuringiensis, Bacillus entomocidus,* or *Bacillus sotto,* growing on the surface of an agar-agar plant. The Erlenmeyer flask is incubated at about 30° C. under strongly aerobic conditions which may be provided, for instance, by placing the flasks on a rotating shaker. Twenty-four hours later, a 1-liter flask containing 125 ml. of an appropriate liquid medium is inoculated with the medium from the Erlenmeyer flask. This 1-liter flask is again incubated for 24 hours at 30° C. with strong agitation and it may then be employed to inoculate a suitable nutrient medium in any suitable fermentor. A suitable medium comprises the following ingredients in an amount that may be adjusted to suit for optimum yields within the range specified. Preferably, the medium is sterilized before inoculation with the bacillus.

|  | Percent |
|---|---|
| Casein | 1.0–3.65 |
| Corn steep water | 1.0–5.0 |
| Starch | 0–9.2 |
| Sucrose | 0.6–3.5 |
| Black strap molasses | 0–9.2 |
| Dried yeast | 0.5–0.8 |
| $Na_2HPO_4$ | 0.42–0.60 |
| $KH_2PO_4$ | 0.17–0.24 |

During the fermentation, it is preferable that the medium have a pH in the range of about 5 to 8, preferably 6.5 to 7.5. Generally, it may be adjusted to the desired pH by addition of a suitable base, such as sodium hydroxide, potassium hydroxide, ammonia, and the like. The progress of the growth of the bacillus may be followed by microscopical examinations of samples of the culture medium.

In the process of the invention, the growth and development of the bacillus follow a course that may be divided into a plurality of stages, generally overlapping to some extent. As growth of the bacillus proceeds, a peak count of vegetative cells is attained, followed by a peak in sporulation. During and/or after sporulation toxins may be produced. Then the process may be stopped. Preferably, it is continued to a third stage during which the bacterial cell walls disintegrate releasing spores and asporal inclusion bodies.

In accordance with the process, growth of the bacillus may be continued till the desired vegetative cell count is reached, preferably accompanied with a sporulation of at least 90% of the bacterial population. A notable embodiment comprises growing the bacillus to give a peak cell count of over $5 \times 10^9$ per milliliter and preferably over $7 \times 10^9$, over $10 \times 10^9$ bacillus per milliliter being especially desirable. Most desirable, this is concomitant with a sporulation of at least 90% and preferably at least 95% of the bacterial population.

A favored aspect of the process comprises growing a Bacillus to reach a peak vegetative cell count during a lapse of 20 to 30 hours, preferably 24 to 26 hours, followed by a peak sporulation count during an additional time lapse of 20 to 30 hours, preferably 24 to 28 hours, and stopping the process after an additional 4 to 8 hours. This combination of conditions appear to be unusually favorable in promoting excellent development of spores, inclusion bodies, and other toxins. When in combination with these conditions, the Bacillus is grown to give a cell count of over $8 \times 10^9$ per milliliter, there is a further enhancement of useful and desirable properties in the microbial pesticide composition.

As a further refinement of the process that may be used in conjunction with or without its preferred embodiments, the medium used to grow the bacillus may contain at least 6%, or better, 8%, of total nutrient solids, at least 10% total nutrients being a very desirable level. Unlike prior conventional techniques that appeared to restrict the nutrient intake of the bacillus, the present medium seems to promote the development of the desired properties in the bacillus and in the ultimate pesticidal compositions. When any one or all of these described features are carried out with a medium, of a total volume of at least three liters and preferably six liters, it appears to further insure excellent growth, sporulation and development of inclusion bodies and other toxins.

In a further embodiment of the invention, the spores, the inclusion bodies and the water-soluble toxins of the Bacillus are separated, either individually or not, from the aqueous spent medium. If desired, these elements may be remixed, and this may be done to increase or decrease their respective proportion to any desired extent to obtain compositions having varying concentrations of these elements.

The process for separating the various elements from the aqueous spent medium includes increasing the concentration of these above-mentioned elements to any desired level, including to the degree at which dry product is obtained. Within the context of the invention, the terms increasing the concentration are used in their widest possible meaning to define the decreasing of the proportion of water with respect to the non-aqueous elements, regardless of whether these elements are water-soluble or not. Included in this definition is freeze-drying the liquid composition, and equivalent techniques, whereby ice crystals are formed and vaporized. If desired, the composition may be kept frozen.

Increasing the concentration of the water-insoluble asporal bodies, the water-soluble toxins, and of the spores, may be accomplished by removal of the water from the fermentation liquor. This may be accomplished at any time the concentration of spores, inclusion bodies or water-soluble toxins, has reached the desired level. The concentration may be carried out in a number of ways. One procedure is by vaporizing the water from the growth medium till the desired degree of dehydration of the product is obtained. This may be accomplished by concentrating, by evaporation, as by heating, preferably under vacuo, by drying, spray-drying, freeze-drying the growth medium, or by any combination of these methods and equivalent ones.

Another manner of separating the desired ingredients comprises removing the water-insoluble elements comprising the spores, asporal inclusion bodies and other water-insoluble elements, such as bacterial cells and debris, from the growth medium, then separating the water-soluble elements from the aqueous phase. If desired, the concentration of water-soluble toxic elements in the aqueous phase may be increased to any desired extent and then, if desired, the insoluble elements and the water-soluble elements may be again recombined. One procedure by which this may be achieved is by filtering the spent medium, thereby collecting spores, asporal inclusions, and other insolubles, and treating the filtrate containing the water-soluble elements with an adsorbing material, with a flocculant, or with a precipitant which separates the water-solubles comprising water-soluble toxins from the water. The separating material may be organic and/or inorganic; it may combine physically and/or chemically with the water-soluble toxins. It may, for instance, convert the water-soluble toxins which may be in the form of their water-soluble salts to their water-insoluble salts. An absorbing material such as activated carbons, coconut shell, charcoal, alumina, clays, bentonites, fuller's earth, silica gels, zeolite, ion exchange resins, such as anion exchange resins and like materials may be used. Or, a precipitant may be used to form water-insoluble salts such as those of the alkaline earth metals; magnesium, calcium, barium and the like. These may be used as the chloride, the sulfate, sulfites, phosphate, aluminates, ammonia, carbonate, citrate, and the like; also mixed salts may be used. Alternatively, the separation of the water-soluble toxins may be carried out on a medium in which the water-insoluble elements are present.

In the method for separating the water-soluble toxins from the aqueous medium, it is generally desirable to bring the pH of the medium within the optimum range for causing the separation, as by absorption, flocculation, precipitation, or like manner. The pH adjustment may be carried out during, before, or after the treatment with the separating material. The optimum pH range for separation will broadly vary depending, amongst other factors, on the particular nutrient and other ingredients of the medium, its pH, the nature of the separating agent used, since it, too, might influence the pH, and the other factors, such as temperature. Generally, a pH in the range of 3.5 to 7.5 gives satisfactory results. Adjustments of the pH may be accomplished with alkaline materials, like the hydroxides, carbonates, and the like of the alkali metals, such as sodium, potassium, and the like, or acids such as mineral or organic acids or their salts.

The amount of separating agent is not critical, the optimum amount depending on the type of separating agent, its effectiveness, and other factors evident to one skilled in the art. For instance, the separating agent can be regenerated and reused several times, as in the case of an ion exchange resin, till the desired amount of toxin solubles is removed from the nutrient medium.

Any one of the products obtained from the aqueous medium may be used as such or they may be further treated as by drying, by rotary drying, tray drying, or spray drying. Crude liquid products may be centrifuged and the resulting cake may be dried; or the crude product may be filtered and the filter cake may then be dried.

The process of the invention also provides for a method for separating the spores of an inclusion body-forming Bacillus from the inclusion bodies and the water-soluble toxins of an inclusion body-forming Bacillus. The method comprises separating the water-soluble toxins of the Bacillus, as by filtering, thereby obtaining the inclusion bodies and the spores of the Bacillus and treating this water-insoluble element with aqueous alkali, such as a solution having a pH at least 9.0 of an alkaline metal such as sodium, or potassium hydroxide, and filtering the product thereby yielding a composition comprising spores of the Bacillus essentially free of inclusion bodies and water-soluble toxins of the Bacillus.

There is also provided a method for separation of the inclusion bodies of a Bacillus which comprises separating the water-soluble toxins of the Bacillus, thereby obtaining a composition comprising spores and inclusion bodies of the Bacillus, germinating the spores thereof to give the vegetative cells and separating the latter, thereby giving a composition comprising the inclusion bodies of a Bacillus which is essentially free of its spores. The germination of the spores may be carried out in nutrient medium comprising assimilable carbohydrate, such as a solution of molasses, sucrose, glucose and the like, or there may be used the medium used to grow the Bacillus. The mixture of vegetative cells, and inclusion bodies with any residual spores, if any, is treated with a water-immiscible solvent which promotes the separation of the vegetative cells. Useful for this purpose are halogenated hydrocarbons such as fluoromethanes, fluorochloromethanes and the like. This process of germination and separation of vegetative cells may be repeated, if desired, until the product is essentially free of spores.

In this manner, there may be obtained compositions comprising any one of the three elements and spores, inclusion bodies and water-soluble toxins of a Bacillus free of any one or both of the other elements. The individual elements discussed above may be remixed in any desired combination to give compositions comprising two or more or all of the elements, in any desired proportion. If desired, mixed compositions may be prepared wherein one or more of the above-described elements is derived from a different microorganism, fungus or bacillus. For instance, a composition may comprise the water-soluble toxins of Bacillus entomocidus, the spores of Bacillus thuringiensis, and the inclusion bodies of Bacillus sotto. Likewise, the water-soluble toxins may be provided by a pathogenic microorganism, a fungi or a bacillus, while the spores and inclusion bodies may be provided by the same or different Bacillus. Moreover, the water-soluble toxins need not be developed by a microorganism but it may be provided by chemical synthesis.

In the compositions comprising spores and inclusion bodies of a Bacillus, their number will generally be substantially equal, i.e. in a relative proportion of 1:1 but as described above, the various compositions may be mixed to give compositions where the inclusion bodies will predominate over the spores or vice versa, e.g. in a ratio of 2:1 or 10,000:1, or in any intermediate range.

In the compositions comprising spores of the Bacillus, they are generally viable, i.e. they are capable under suitable conditions of germinating. Yet, the spores may also be in a non-viable state, i.e. they will not grow any longer, or they may be in a dormant state or apparently non-viable.

In the compositions of the invention, preferably the number of spores is over $15 \times 10^9$ and especially over $30 \times 10^9$ per gram. Very valuable compositions are prepared with spores numbering at least $60 \times 10^9$ per gram. In the compositions, the spores and/or the inclusion bodies may be released from the cells of the Bacillus which formerly contained them, the cells of the Bacillus having been autolyzed. When the spores and/or the inclusion bodies are thus released, the compositions present special advantages. When the compositions comprise inclusion bodies, spores and water-soluble toxins, it is typified by a unique spectrum of toxicity on noxious pests. It is toxic to insects typified by salt-marsh caterpillars, southern army worms, and the larvae of the common housefly. Preferably, the composition has the following toxicity spectrum:

| | $LD_{50}$ | |
|---|---|---|
| | Concentration (maximum), p.p.m. | Concentration (preferred), p.p.m. |
| Salt-marsh caterpillars | 300 | 100-20 |
| Southern army worms | 7,500 | 2,400-1,000 |
| Fly larvae | 900 | 300-50 |

Compositions in which either one or more of the toxic elements, spores, inclusion bodies or water-soluble toxins are absent, exhibit a more specific toxicity. Amongst such compositions are those comprising the water-soluble toxins which are toxic on insects typified by southern army worms and the absence of any material toxic on insects, typified by salt-marsh caterpillars. Preferred compositions are those having an $LD_{50}$ with a maximum of 7500 p.p.m., preferably a maximum of 1500 p.p.m., and especially 1000 p.p.m. of the material.

The compositions of the invention are provided in the solid or liquid form; they may also assume any consistency intermediate thereto.

The liquid compositions may be fermentation medium of the invention which contain the minimum desirable pesticidal activity. Generally, it is preferred that the liquid composition comprise more than $5 \times 10^9$, preferably at least $10 \times 10^9$, and more specially at least $15 \times 10^9$, spores per millimeter with or without inclusion bodies. When, concomitant with this number of spores, the majority of baceterial cells is in the autolyzed state, the composition exhibits an enhancement of pesticidal activity. Preferably, at least 90% of the cells are autolyzed, thus having released both their spores and their inclusion bodies. If desired, autolysis of the cells to free the spores, the inclusion bodies and any other endocellular ingredient, may be promoted by the use of autolyzing agents, chemical or biochemical, such as enzymes. These may be used in the fermentation medium as the bacillus grows or on the final fermentation medium.

When the liquid compositions comprise spores, inclusion bodies and water-soluble toxins they have preferably the following minimum toxicity:

An $LD_{50}$ on southern army worms with a maximum of 25,000 p.p.m., and $LD_{50}$ on salt-marsh caterpillars with a maximum of 1000 p.p.m. and an $LD_{50}$ on flies larvae with a maximum of 3000 p.p.m.. More preferably, the maxima are 5000 p.p.m., 200 p.p.m., and 600 p.p.m., respectively. When the compositions comprise the water-soluble toxins, they may be typified by a minimum toxicity of an $LD_{50}$ on southern army worms with no more than 50,000 p.p.m. of the material. When the composition comprises both water-soluble toxins and spores and/or inclusion bodies, their minimum toxicity may be typified by an $LD_{50}$ on southern army worms with not more than 50,000 p.p.m. and an $LD_{50}$ on salt-marsh caterpillars with no more than 2000 p.p.m. of the material. More preferred compositions have higher toxicity levels.

The liquid composition of the invention may be concentrated to any desired extent till, if desired, a solid composition is obtained. The degree of concentration carried out depends on many factors, amongst others on the nature of the growth medium and the extent of growth of the bacillus. Generally, by concentration in the range of 2 to 4 fold, and preferably 3 to 4 fold, there is obtained a satisfactory product. As a general rule, the liquid microbial pesticide has a content of not more than 40% solids, preferably 25 to 35% solids concentration. Of course, when a higher viscosity is not objectionable, or when it is compensated by viscosity reducers, concentration may be carried to any intermediate degree and the dry product. If desired, there may be incorporated with the liquid product an inhibitor of fungal and/or bacterial contamination. Any pesticide, such as fungicide or bactericide which is compatible with the microbial product, may be used. Also stabilizers may be used. Typical are the salts of alkali metals and alkaline earth metals, such as potassium, sodium, calcium, magnesium, and others such as manganese, iron, copper, aluminum, cobalt, and nickel. These may be used in any desired form, such as their sulfates, phosphate, chloride salts, and the like. The amount of inhibitor may be 0.5 to 20, preferably 5 to 10% and such that, while it provides inhibition in the liquid composition, it has no objectionable effect on the pesticide activity of the microbial composition upon dilution at time of its use.

The compositions of the invention may be used in any form best suited for the purpose and application intended. There may be used the fermentation liquid which has reached the desired stage of development as measured in cell or spore count, or number of inclusion bodies. Preferably, these compositions are concentrated to the desired extent. Also, solid compositions may be used. They may be compounded into dusts by incorporating with the active ingredients finely divided solids. Wettable powders may also be prepared which are extendable with water to give dilute sprays. The wettable powder may comprise a dispersing agent and a finely divided solid. The liquid compositions may also be compounded as emulsifiable concentrates which, upon dilution with water, provide effective sprays. Typical emulsifiers that may be used include alkylphenoxypolyethoxyethanols containing from about 6 to 10 ethoxy units per molecule, polymeric surfactants such as those of the reaction of phenolformaldehyde condensates with ethylene oxide, water-soluble phthalic anhydride alkyd glycerol resin condensates, alkyl and alkaryl sulfonates, alkyl sulfonates, alkylamide sulfonates, fatty acid esters of polyhydric alcohols, the ethylene oxide addition products of said esters and the addition products of long chain mercaptans and ethylene oxide. Solids useful in wettable powders and dusts include clays, pyrophyllite, talc, diatomaceous earth, calcium silicate, magnesium carbonate, or calcium carbonate, and filter cell, ground phosphate rock, tobacco stems, and sulfur. Also, organic liquids like oils may be used as carriers alone or in conjunction with the other ingredients; typical are vegetable oils like coconut oil, pine oil, naphthas, methylated naphthalene, xylene, and the like. These adjuvants may be incorporated at any time with the composition of the invention. They may be incorporated in the medium or during any step leading to the preparation of the desired preparations, liquids, or solids. Conveniently, the bacterial cell debris also act as carrier or diluent in the compositions of the inventions.

The microbial pesticide compositions of the invention are useful for controlling the numerous pests, generally those of the phylum Arthropoda, such as those of the Insecta and Arachnida classes, and, for instance, those of the Lepidoptera order. For instance, the compositions of the invention are useful for the control of various pests, such as imported cabbage worm, cabbage loopers, artichoke plume moths, and corn ear worms; on various vegetable crops, such as on cabbage, cauliflower, broccoli, celery, lettuce, spinach, potatoes, artichokes, beans, and the like; for the control of horn worm, alfalfa caterpillar, army cut worm, salt-marsh caterpillar, corn ear worm, and European cornborer; on various agricultural crops, such as tobacco, alfalfa, corn, cotton, and the like; for the control of pests such as coddling moth, red banded leaf roller, canker worm, cotton leaf perforator, bold worm, cabbage looper, melon worm, and other insects infesting fruit, such as apples, grapes, berries, melons, tomatoes, and the like; for the control of larvae of cabbage butterfly, tent caterpillar, nun moth, Indian meal moth and others; for the control of pests, such as the gypsy moth as on elm trees and an other deciduous and nondeciduous trees; for the control of pests, such as the poultry mite, poultry louse, mosquito larvae, and fly larvae, and the like. In applications against fly larvae and similar pests the compositions of the present invention may be used as a feed supplement of various animals. Upon excretion, as a component of the manure, they effectively inhibit the growth of the fly and other larvae of noxious pests.

The following examples may further illustrate the invention. Parts are by weight unless designated otherwise. It will readily be apparent to one skilled in the art that equivalent materials and alternate steps designed to achieve similar end can be readily used without departing from the scope of this invention:

EXAMPLES 1–3

The inocula used in the flasks and kettles are prepared by growing the selected entomogenous spore-forming bacteria on the surface of nutrient agar for 48 to 72 hours, at 30° C., the time to obtain a fully sporulated culture. The growth from the agar culture is suspended in sterile, distilled water and aliquots of this suspension are used to inoculate the sterile growth media.

The bacterium is grown at a temperature in the range of 20° to 35° C., generally at about 30° C. The pH is preferably maintained in the range of 6 to 8. In the following examples, all parts are by weight, unless specified otherwise. Total nutrient solids is indicated as percent TNS. Corn steep water is calculated as 50% solids. All cell counts are peak cell counts. In the tables, the parts represent percent by weight. During the growing of the cells, samples are taken and cells counted to follow their development.

In the following examples, the microorganism is *Bacillus thuringiensis*.

Table I

| Examples (a) | 1 | 2 | 3 |
|---|---|---|---|
| Medium: | | | |
| Sucrose | 1 | 2 | 1 |
| Corn steep water | 1 | 1 | 1 |
| Dried yeast | 0.4 | 0.4 | 0.4 |
| Casein | 1.5 | 1.5 | |
| Corn starch | 3.75 | 0 | |
| Phosphate buffer | 0.9 | 0.9 | |
| TNS | 7.15 | 4.4 | 2 |
| Cell count ($\times 10^9$) | 3.2 | 1.8 | 0.5 |

Total sporulation is obtained in the cells. Liquid cultures of $1(a)$, $2(a)$, and $3(a)$ are toxic to southern army worms and salt-marsh caterpillars. Portions of the whole spent growth medium of $1(a)$, $2(a)$ and $3(a)$ are then treated by admixing 0.5 to 3% $CaCl_2$. A flocculant settles at the bottom. To the whole medium, there is then added enough potassium hydroxide to bring the pH to 6.5 and about 2% of diatomaceous earth is added. The whole spent medium is then filtered. The filter cake is collected and air dried on trays. The cake is micropulverized to a free-flowing beige powder. Sprays of this powder gave an $LD_{50}$ of 100 p.p.m. on salt-marsh caterpillars.

$1(b)$ A portion of the whole spent medium of part $1(a)$ is treated substituting $MgCl_2$ for the $CaCl_2$. The cake is collected in the same manner as in $(a)$.

Example 2: $(b)$ Likewise, $BaCl_2$ is substituted for $CaCl_2$.

Example 3: $(b)$ Ammonium chloride is admixed to the spent medium. The product is concentrated, there is added 0.5 part of a modified phthalic glycerol alkyd resin as wetting agent. The product is dried to a powder. The product is toxic to salt-marsh caterpillar larvae infesting bean leaves.

The following bacilli (Table II) are grown in 1-liter shaker flasks in the following medium (Table III) at 30° C. on a rotary shaker.

Table II

| Example | Bacillus |
|---|---|
| 4(a) | *Bacillus thuringiensis* Berliner. |
| 5(a) | *Bacillus sotto*. |
| 6(a) | *Bacillus thuringiensis* var. *alesti*. |
| 7(a) | *Bacillus entomocidus*. |
| 8(a) | *Bacillus thuringiensis gallerae*. |
| 9(a) | *Bacillus bombyces* Pasteur. |
| 10(a) | *Bacillus thuringiensis* Cazaubon. |

Table III

Medium:
Corn starch _____ 2.2
Sucrose _____ 0.2
Casein _____ 0.6
Corn steep water _____ 1.5
Yeast _____ 0.2
Phospate salts _____ 0.2

Profuse growth and sporulation are obtained in 50 to 70 hours.

EXAMPLES 4 TO 10(a)

The spent fermentation medium of each flask is defecated with calcium chloride. The pH of the culture is readjusted to pH 6.5 with sodium hydroxide and 2% diatomaceous earth is added. The material is then filtered and the filter cake dried. The cakes are pulverized. The aqueous suspensions are toxic to southern army worm and salt-marsh caterpillars.

The following examples are carried out in 8-liter kettles with 4-liters of medium. Agitation is provided by mechanical agitator and with air bubbling; the temperature is maintained at 30° C. The runs are carried out with *Bacillus thuringiensis*.

Table IV

| Examples (a) | 11 | 12 | 13 | 14 |
|---|---|---|---|---|
| Medium: | | | | |
| Molasses | 0 | 0 | 0 | 3.25 |
| Corn starch | 9.0 | 2.6 | 4.5 | 2.6 |
| Sucrose | 0.81 | 2.6 | 0.9 | 0 |
| Casein | 3.65 | 1.9 | 2.0 | 0 |
| Corn steep | 3.65 | 4.7 | 2.0 | 4.7 |
| Cotton seed meal | 0 | 0 | 0 | 1.9 |
| Phosphate buffer | 0.77 | 0.6 | 0.80 | 0.6 |
| Dried yeast | 0.81 | 0.65 | 0.54 | 0.65 |
| TNS | 16.1 | 10.1 | 9.0 | 10.1 |
| Cell count ($\times 10^9$) | 13 | 14 | 20 | 13 |

Within 20 to 30 hours, peak vegetative cell count is observed; in another 32 to 36 hours, the cells are sporulated and over 95% of the spores and inclusion bodies are released by autolysis of the cells.

EXAMPLE 11

$(c)$ The medium is defecated with calcium chloride. The precipitate is filtered off and dried. Sprays of the powder kills salt-marsh caterpillars, southern army worms and fly larvae.

EXAMPLE 12

$(b)$ Part $(a)$ is repeated using *Bacillus bombyces*.
$(c)$ The medium is concentrated 3-fold under vacuo. Samples of this concentrate are toxic to southern army worms, salt-marsh caterpillars and fly larvae.

EXAMPLE 13

$(b)$ The medium is spray-dried to a powder. The material is toxic to cabbage worms, cabbage loopers and artichoke plume moth when diluted and applied as a dust at the rate of 20 to 30 lbs. per acre.

EXAMPLE 14

$(b-1)$ The medium is filtered. The filtrate is treated with 3% calcium chloride. The precipitate is dried to a powder. On application as a dust, it controls army worms on bean leaves.

$(b-2)$ The filter cake of (1) is dried, 30 parts are mixed with 30 parts of the powder of $14(b-1)$. The resulting powder is toxic to army worms and salt-marsh caterpillars.

$(c)$ The whole is concentrated 2-fold under vacuo; it is then treated with potassium hydroxide (pH 12) thereby dissolving the inclusion bodies. The liquid is filtered thereby collecting the spores.

EXAMPLES 15 TO 18

In the following examples, *Bacillus thuringiensis* is grown in 20-liter kettles. The temperature is in the range of 25° to 35° C. Mechanical agitation is provided by an impeller; air is bubbled through the medium for aeration. The following media are used.

Table V

| Examples (a) | 15 | 16 | 17 | 18 |
|---|---|---|---|---|
| Medium: | | | | |
| Sucrose | 3.5 | 1.3 | 0.64 | 0.64 |
| Casein | 2.0 | 2.0 | 1.9 | 1.9 |
| Corn steep liquor | 4.8 | 4.8 | 4.7 | 4.7 |
| Corn starch | 0 | 2.2 | 6.8 | 6.8 |
| Phosphate buffer | 0.6 | 0.6 | 0.6 | 0.6 |
| Dried yeast | 0.7 | 0.7 | 0.6 | 0.6 |
| TNS | 8.5 | 8.6 | 12.3 | 12.3 |
| Cell count ($\times 10^9$) | 7.7 | 6.9 | 14 | 16 |

Over 95% sporulation occurs in 52 to 56 hours. The batches are dropped within the next 4 to 8 hours at which time over 95% of the cell wall has autolyzed.

EXAMPLES 15 TO 18

A portion of the spent fermentation liquid is concentrated 3-fold. One percent dioctyl sodium sulfosuccinate in added. The compositions are toxic to fly larvae.

15(c) To another portion of the spent medium of 15(a) are added 10% NaCl. The liquid composition is effective on army worms.

16(b) The spent fermentation medium is mixed with diatomaceous earth and dried in a rotary drier. The dry product is toxic on corn ear worm, on beans and tobacco horn worm in applications as a dust.

17(b) To the whole culture, there is added 1% sucrose, the liquid is incubated on the rotary shaker for 12 hours at 30° C. thereby germinating the spores. The culture is shaken with an equal volume of trichlorotrifluoroethane giving two phases and an emulsion, at the interface. The inclusion bodies and residual ungerminated spores are concentrated in the aqueous phase whereas the vegetative cells concentrate in the interfacial layer. The aqueous phase is separated. Residual spores are germinated as shown above, and the treatment with the organic liquid is repeated to obtain a product essentially free of spores and comprising water-soluble toxins and inclusion bodies. The liquid composition is toxic to salt marsh caterpillars and southern army worms.

17(*c*) A wettable powder is prepared by admixture of 2 parts of diatomaceous earth and 0.10 part of an octylphenoxypolyethoxyethanol averaging 10 ether groups to 100 parts of the above liquid and spray drying the product. It is toxic to southern army worms and salt-marsh caterpillars.

17(*d*) Part 17(*b*) is repeated using dichlorotetrafluoroethane as the organic liquid.

Other water-immiscible organic liquids are used in a similar way.

18(*b*) A spray prepared from the dried cake has an $LD_{50}$ of 38 p.p.m. on salt-marsh caterpillars.

EXAMPLE 19

The procedure of the Examples 15 to 18 is repeated but the TNS is adjusted to 6.75. The liquid composition is toxic to insect larvae.

EXAMPLES 20 AND 21

In the following examples, *Bacillus entomocidus* is grown in 8-liter kettles at 30° C. The medium is as follows:

*Table VI*

| Examples (*a*) | 20 | 21 |
|---|---|---|
| Medium: | | |
| Corn starch | 6.8 | 2.6 |
| Sucrose | 0.64 | 2.6 |
| Casein | 1.9 | 1.9 |
| Corn steep | 4.7 | 4.7 |
| Yeast extract | 0.64 | 0.65 |
| Phosphate buffer | 0.8 | 0.8 |
| TNS | 12.3 | 10.1 |
| Cell count ($\times 10^9$) | 12 | 12 |

After 50 hours, the batches are dropped.

20–21(*b*) Part (*a*) is repeated substituting an equivalent of hominy for the corn starch and sucrose.

20(*c*) A portion of the medium is treated with calcium chloride and the resulting precipitate is dried. A wettable spray prepared therefrom with sodium dodecyl sulfate gives an $LD_{50}$ of 72 p.p.m. on salt-marsh caterpillars. The composition gives an $LD_{50}$ of less than 2500 p.p.m. on army worm. It is effective to control housefly larvae in cattle and poultry droppings when used at a rate of 0.25 to 2 gr./lb. of feed.

20(*d*) In part 20(*c*), ammonium chloride is substituted for the calcium chloride and the composition is concentrated and dried.

20(*e*) In part 20(*d*) ammonium acetate is substituted for the ammonium chloride.

20(*f*) In part 20(*d*) sodium acetate is substituted for the ammonium chloride.

21(*c*) A sample of the final whole culture medium has an $LD_{50}$ on southern army worms of 50,000 p.p.m. The medium is acidified to a pH of 3.5 to 4.0 with hydrochloric acid and filtered. The filtrate is adjusted to a pH of 6.5 with sodium hydroxide and enough calcium chloride is admixed to give a precipitate. A sample of the precipitate has an $LD_{50}$ of 1000 p.p.m. on southern army worms. It is then redissolved in water acidified to a pH of 3.5 with hydrochloric acid. Potassium oxalate is added till no more precipitate is formed. The calcium oxalate precipitate is filtered off, the pH of the filtrate is adjusted to 6.5 with potassium hydroxide and evaporated to dryness giving a product with an $LD_{50}$ of 500 p.p.m. for army worms. It is soluble in water.

21(*d*) In part (*c*) calcium chloride is replaced by barium chloride to give a precipitate.

21(*e*) In part (*c*) the potassium oxalate is replaced by ammonium oxalate. The solution is toxic on southern army worms.

EXAMPLE 22

There are mixed 100 parts of the dried product of 20(*c*) with 100 parts of the composition obtained in 17(*c*) The resulting product is toxic to southern army worms and to salt-mash caterpillars.

EXAMPLE 23

To 100 parts of the product of 17(*c*), there is admixed 100 parts of the product obtained in 14(*c*). The resulting product is toxic to southern army worms and to salt-mash caterpillars.

EXAMPLES 24 TO 26

In the following examples (24–25) *Bacillus thuringiensis* is grown in 30 gallon tanks; in Example 26, a 2500 gallon tank is used. The temperature is 30° to 35° C.

*Table VII*

| Examples (*a*) | 24 | 25 | 26 |
|---|---|---|---|
| Medium: | | | |
| Corn Starch | 6.8 | 2.6 | 2.6 |
| Sucrose | 0.64 | 2.6 | 2.6 |
| Casein | 1.94 | 1.9 | 1.9 |
| Corn steep | 4.7 | 4.7 | 4.7 |
| Yeast | 0.6 | 0.65 | 0.65 |
| Phosphate buffer | 0.6 | 0.60 | 0.60 |
| TNS | 12.3 | 10.1 | 10.1 |
| Cell count ($\times 10^9$) | 14 | 12 | 12 |

24(*b*) The final fermentation medium is concentrated 3-fold and a powdery material is obtained by freeze-drying. The powder is toxic to insect larvae.

25(*b*) The final fermentation medium is treated with barium chloride, thereby causing a precipitate to form. The insoluble material is filtered out. It is dried and a wettable powder thereof is toxic to army worms.

26(*b*) The final fermentation medium is concentrated 2-fold. The spores in the liquid are regerminated by adding molasses thereto, the vegetative cells are removed, thereby obtaining a liquid free of the major proportion of spores. The product is spray-dried after addition of 0.1% octylphenoxypolyethoxyethanol. The resulting product is toxic to salt-mash caterpillars.

24(*c*) Another portion of the final fermentation medium is spray-dried. To 50 parts of the product there are added 500 parts of anhydrous aluminum silicate. The product containing $6 \times 10^9$ spores/gram applied as a dry dust at the rate of about 10 lb./acre to combat cabbage loopers.

25(*c*) A concentrate is prepared by mixing 90 parts of the final medium with 2 parts of a water-soluble phthalic anhydride-glycerol alkyd resin. The product is spray-dried and micropulverized. The product is toxic to tobacco bud worm.

26(*c*) An emulsion concentrate is prepared as follows: Equal parts of coconut oil and of the product obtained by spray-drying as in 25(*a*) are mixed with 5 parts of octylphenoxypolyethoxyethanol. The concentrate is selfemulsifying when mixed with water. It is applicable to elm trees to combat gypsy moths.

TOXICITY TESTS (1) *Housefly Maggot* (Musca domestica)

The bottom of a Petri dish (100 x 100 x 20 mm.) is fitted with a filter paper (75 mm.) and 1 ml. of water is placed on the filter paper. Eggs of houseflies are washed with water at 30° C. and a water suspension containing about 25 eggs per ml. is prepared. One ml. of this suspension is pipetted onto each piece of filter paper on the Petri dishes. The number of eggs in each dish is counted with a colony counter. The plates are incubated for six hours at 30° C., 50% relative humidity. At this time, 1 ml. of an appropriate dilution of the test material is pipetted into each dish. All concentrations are run in duplicate and generally four or five, either 5-fold or 10-fold dilutions, are tested for each sample. The plates are incubated for 24 hours at 30° C., 50% relative humidity and the number of dead maggots counted. A percent kill is calculated based on the number of eggs originally used. The data are plotted and an $LD_{50}$ value is determined.

(2) *Southern Army Worm* (Prodemia eridania)

The material to be tested is prepared in various concentrations, including a dilution from 50% to 0.5% concentration, using 5- and 10-fold increments. The dilutions are sprayed to run off onto the primary leaves of 7 to 10 day old bean plants. A cage containing 10 larvae of the insect, 10 days old, and in the fourth instar, is then placed over the leaf section of the plant. Four replicas are run for each dilution in the series. The larvae on the caged plants are kept in a lighted room at 75° to 78° F. and 45% relative humidity. After 4 days, the cages are removed and the percentage of the larvae killed, including those incapable of coordinated movement, is determined. At the same time, if desired, the percentage feeding may be determined from an estimation of actual leaf damage. The $LD_{50}$ is determined from a plot of the results for each concentration.

(3) *Salt-Marsh Caterpillars* (Estigmene acrea)

Bean plants, 7 to 10 days old, are sprayed with the test material at the desired dilutions, to run off. Each concentration is repeated 4 times with each replicate consisting of 10 caterpillars. The plants are incubated at 75–78° F. at 50% relative humidity. After four days, the number of caterpillars killed by each concentration are counted. The $LD_{50}$ is determined from a plot of the results for each concentration.

We claim:

1. A process which comprises growing an inclusion body-forming and spore-forming Bacillus under aerobic, submerged conditions in a medium comprising assimilable carbohydrate and assimilable nitrogen, at least until the population of said Bacillus numbers over $7 \times 10^9$ cells per ml., said carbohydrate and nitrogen being present in amounts sufficient to permit growth to said population.

2. A process which comprises growing an inclusion body-forming and spore-forming Bacillus under aerobic, submerged conditions in a medium comprising assimilable carbohydrate and assimilable nitrogen, at least until the population of said Bacillus numbers over $7 \times 10^9$ cells per ml., over 90% of the Bacillus having developed a spore and an inclusion body, said carbohydrate and nitrogen being present in amounts sufficient to permit growth to said population.

3. A process which comprises growing an inclusion body-forming and spore-forming Bacillus under aerobic, submerged conditions in a medium comprising assimilable carbohydrate and assimilable nitrogen, at least until 60% of the population of said Bacillus cells has released their spores and inclusion bodies, 4. A process which comprises growing an inclusion body-forming and spore-forming Bacillus under aerobic, submerged conditions in a medium comprising assimilable carbohydrate and assimilable nitrogen totaling at least 8% nutrient solids.

5. A process which comprises growing an inclusion body-forming and spore-forming Bacillus under aerobic, submerged conditions in a medium comprising assimilable carbohydrate and assimilable nitrogen, at least until the population of said Bacillus numbers over $5 \times 10^9$ cells per ml., at least 90% of the population having developed a spore and an inclusion body and at least 60% of the population having released both said spores and inclusion bodies.

6. A process which comprises growing an inclusion body-forming and spore-forming Bacillus under aerobic, submerged conditions in a medium comprising assimilable carbohydrate and assimilable nitrogen totaling at least 6% nutrient solids, at least until the population of said Bacillus numbers over $5 \times 10^9$ cells per ml., at least 90% of the population having developed a spore and an inclusion body and at least 60% of the population having released both said spores and inclusion bodies.

7. A process which comprises growing an inclusion body-forming and spore-forming Bacillus selected from the group consisting of *Bacillus sotto*, *Bacillus entomociddus* and *Bacillus thuringiensis*, under aerobic, submerged conditions in a medium comprising assimilable carbohydrate and assimilable nitrogen at least until 60% of the population of said Bacillus has released both their spores and their inclusion bodies.

8. A process which comprises growing an inclusion body-forming and spore-forming Bacillus under aerobic, submerged conditions in a medium comprising assimilable carbohydrate and assimilable nitrogen totaling at least 10% nutrient solids, until the population of said Bacillus numbers at least $10 \times 10^9$ cells per ml., over 90% of the Bacillus having developed a spore and an inclusion body and at least 90% of the population having released both their spores and inclusion bodies.

9. A process for preparing a composition which comprises growing an inclusion body-forming and spore-forming Bacillus under aerobic, submerged conditions in a medium comprising assimilable carbohydrate and assimilable nitrogen at least until the population of said Bacillus numbers over $7 \times 10^9$ cells per ml., said carbohydrate and nitrogen being present in amounts sufficient to permit growth to said population, and separating the products comprising the spores, the inclusion bodies, and the water-soluble toxins of said Bacillus.

10. A process for preparing a composition which comprises growing an inclusion body-forming and spore-forming Bacillus under aerobic, submerged conditions in a medium comprising assimilable carbohydrate and assimilable nitrogen at least until the population of said Bacillus numbers over $7 \times 10^9$ cells per ml., said carbohydrate and nitrogen being present in amounts sufficient to permit growth to said population and precipitating the water-soluble toxins formed by said Bacillus from the medium, separating the spores, the inclusion bodies and the precipitated water-soluble toxins.

11. The process of claim 10 in which calcium chloride is used to precipitate the water-soluble toxins.

12. A process for preparing a composition which comprises growing an inclusion body-forming and spore-forming Bacillus under aerobic, submerged conditions in a medium comprising assimilable carbohydrate and assimilable nitrogen at least until the population of said Bacillus numbers over $7 \times 10^9$ cells per ml., said carbohydrate and nitrogen being present in amounts sufficient to permit growth to said population, forming the water-insoluble salts of the water-soluble toxins formed by said Bacillus and separating said water-insoluble salts.

13. A process for preparing a composition which comprises growing an inclusion body-forming and spore-forming Bacillus under aerobic, submerged conditions in a medium comprising assimilable carbohydrate and assimilable nitrogen at least until the population of said Bacillus numbers over $7 \times 10^9$ cells per ml., said carbohydrate and nitrogen being present in amounts sufficient to permit growth to said population, thereby producing spores, inclusion bodies and water-soluble toxins, and drying the product.

14. A process for preparing a composition which comprises growing an inclusion body-forming and spore-forming Bacillus under aerobic, submerged conditions in a medium comprising assimilable carbohydrate and assimilable nitrogen at least until the population of said Bacillus numbers over $7 \times 10^9$ cells per ml., said carbohydrate and nitrogen being present in amounts sufficient to permit growth to said population, thereby producing spores, inclusion bodies and water-soluble toxins, and concentrating the product.

15. A process for preparing a composition which comprises mixing the spores, the inclusion bodies and the water-soluble toxins formed by an inclusion body-forming and spore-forming Bacillus.

16. A process for mixing a composition comprising the water-insoluble alkaline earth metal salt of a water-soluble toxin with the spores and the inclusion bodies of an inclusion body-forming and spore-forming Bacillus.

17. A process for mixing the water-soluble toxins, the spores and the inclusion bodies of an inclusion body-forming and spore-forming Bacillus.

18. A process which comprises applying to a larvae infested environment a composition comprising spores, inclusion bodies and the water-soluble toxins of an inclusion body-forming and spore-forming Bacillus, said spores numbering at least $60 \times 10^9$ per gram and said spores and inclusion bodies having been released from the cell of the Bacillus in which they were formerly contained.

19. A process which comprises growing *Bacillus entomocidus* under aerobic, submerged conditions in a medium comprising assimilable carbohydrate and assimilable nitrogen, totalling at least 8% nutrient solids.

References Cited in the file of this patent

Chemical and Engineering News, 36:51, December 22, 1958, page 15.

Fleschner: Science, vol. 129, Number 3348, February 27, 1959, pages 537–549.

Kushner et al.: J. Gen. Microbiology 21, 1959, page 96.